(12) United States Patent
Liu et al.

(10) Patent No.: US 10,901,828 B2
(45) Date of Patent: Jan. 26, 2021

(54) FREEGUARD: A FASTER SECURE HEAP ALLOCATOR

(71) Applicant: The Board of Regents of The University of Texas System, Austin, TX (US)

(72) Inventors: Tongping Liu, San Antonio, TX (US); Sam Silvestro, San Antonio, TX (US); Hongyu Liu, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 74 days.

(21) Appl. No.: 16/172,294

(22) Filed: Oct. 26, 2018

(65) Prior Publication Data

US 2019/0129786 A1 May 2, 2019

Related U.S. Application Data

(60) Provisional application No. 62/577,636, filed on Oct. 26, 2017.

(51) Int. Cl.
*G06F 11/00* (2006.01)
*G06F 11/07* (2006.01)
*G06F 9/50* (2006.01)

(52) U.S. Cl.
CPC ........ *G06F 11/0751* (2013.01); *G06F 9/5016* (2013.01); *G06F 11/073* (2013.01)

(58) Field of Classification Search
CPC .......................... G06F 11/073; G06F 11/0751
See application file for complete search history.

(56) References Cited

U.S. PATENT DOCUMENTS

| 2003/0023656 | A1 | 1/2003 | Hutchison |
| 2009/0235002 | A1 | 9/2009 | Nir-Buchbinder |
| 2010/0138460 | A1* | 6/2010 | Ogasawara ......... G06F 12/0276 707/813 |
| 2012/0030657 | A1 | 2/2012 | Gao |

(Continued)

OTHER PUBLICATIONS

Periklis Akritidis. 2010. Cling: A Memory Allocator to Mitigate Dangling Pointers. In Proceedings of the 19th USENIX Conference on Security (USENIX Security'10). USENIX Association, Berkeley, CA, USA, 12-12. http://dl.acm.org/ citation.cfm? id=1929820. 1929836.

(Continued)

*Primary Examiner* — Charles Ehne
(74) *Attorney, Agent, or Firm* — Smith, Gambrell & Russell LLP (57) ABSTRACT

The techniques described herein may include memory allocation techniques that provide improved security and performance. In embodiments, a method implemented in a computer system may include a processor and a memory, the method may comprise mapping a block of memory, dividing the block of memory into a plurality of heaps, dividing each heap into a plurality of sub-heaps, wherein each sub-heap is associated with one thread of software executing in the computer system, dividing each sub-heap into a plurality of bags, wherein each bag is associated with one size class of objects, and storing a plurality of objects in at least some of the bags, wherein each object is stored in a bag having size class corresponding to a size of the object.

15 Claims, 6 Drawing Sheets

(56) References Cited

U.S. PATENT DOCUMENTS

| | | |
|---|---|---|
| 2013/0332910 A1 | 12/2013 | Ganai |
| 2015/0242276 A1 | 8/2015 | Cain, III |
| 2017/0061012 A1* | 3/2017 | Bortnikov ........... G06F 12/0253 |
| 2019/0114248 A1 | 4/2019 | Liu |

OTHER PUBLICATIONS

Periklis Akritidis, Cristian Cadar, Costin Raiciu, Manuel Costa, and Miguel Castro. 2008. Preventing Memory Error Exploits with WIT. In Proceedings of the 2008 IEEE Symposium on Security and Privacy (SP '08). IEEE Computer Society, Washington, DC, USA, 263-277. https://doi.org/10.1109/SP.2008.30.

Periklis Akritidis, Manuel Costa, Miguel Castro, and Steven Hand. 2009. Baggy bounds checking: an ecient and backwards-compatible defense against out-of-bounds errors. In Proceedings of the 18th conference on USENIX security symposium (SSYM'09). USENIX Association, Berkeley, CA, USA, 51-66. http://dl.acm.org/ citation.cfm?d=1855768.1855772.

Emery D. Berger, Kathryn S. McKinley, Robert D. Blumofe, and Paul R. Wilson. 2000. Hoard: a scalable memory allocator for multithreaded applications. In ASPLOS-IX: Proceedings of the ninth international conference on Architectural support for programming languages and operating systems. ACM Press, New York, NY, USA, 117-128. https://doi.org/10.1145/378993.379232.

Emery D. Berger and Benjamin G. Zom. 2006. DieHard: Probabilistic Memory Safety for Unsafe Languages. In Proceedings of the 27th ACM SIGPLAN Conference on Programming Language Design and Implementation (PLDI '06). ACM, New York, NY, USA, 158-168. https://doi.org/10.1145/1133981.1134000.

Emery D. Berger, Benjamin G. Zom, and Kathryn S. McKinley. 2002. Reconsidering Custom Memory Allocation. In Object-oriented Programming, Systems, Languages, and Applications (OOPSLA '02). https://doi. org/10.1145/582419.582421.

Eep Bhatkar, Daniel C. Duvamey, and R. Sekar. 2003. Address obfuscation: an efficient approach to combat a broad range of memory error exploits. In In Proceedings of the 12th USENIX Security Symposium. 105-120.

Christian Bienia and Kai Li. 2009. PARSEC 2.0: A New Benchmark Suite for Chip-Multiprocessors. In Proceedings of the 5th Annual Workshop on Modeling, Benchmarking and Simulation.

Juan Caballero, Gustavo Grieco, Mark Marron, and Antonio Nappa. 2012. Un-dangle: early detection of dangling pointers in use-after-free and double-free vulnerabilities. In Proceedings of the 2012 International Symposium on Soft-ware Testing and Analysis (ISSTA 2012). ACM, New York, NY, USA, 133-143. https://doi. org/10.1145/2338965.2336769.

SQL Developers. [n. d.]. (Jul. 2019) How SQLite is Tested. https://www.sqlite.org/testing. html. ([n. d.]).

Dinakar Dhurjati, Sumant Kowshik, Vikram Adve, and Chris Lattner. 2003. Memory Safety Without Runtime Checks or Garbage Collection. In Proceed- ings of the 2003 ACM SIGPLAN Conference on Language, Compiler, and Tool for Embedded Systems (LCTES '03). ACM, New York, NY, USA, 69-80. https://doi.org/10.1145/780732.780743.

Jason Evans.2011. jemalloc. http://www.canonware.com/jemalloc/. ([n. d.]).

Jason Evans. (Jan. 2011) Scalable memory allocation using jemalloc. https://krebsonsecurity.com/2016/10/ddos-on-dyn-impacts-twitter-spotify-reddit/. ([n. d.]).

Yi Feng and Emery D. Berger. 2005. A Locality-improving Dynamic Memory Allocator. In Proceedings of the 2005 Workshop on Memory System Performance (MSP '05). ACM, New York, NY, USA, 68-77. https://doi. org/10.1145/1111583.1111594.

The Apache Software Foundation. [n. d.]. (2012) ab—Apache HTTP server benchmarking tool. https://httpd.apache. org/docs/2.4/programs/ab_html. ([n. d.]).

Sanjay Ghemawat and Paul Menage. [n. d.]. (Nov. 15, 2005) TCMalloc : Thread-Caching Malloc. http://goog-perftools.sourceforge.net/doc/tcmalloc.html. ([n. d.]).

David R. Hanson. 1980. A portable storage management system for the icon programming language. (1980), 489-600 pages. https://doi.org/10.1002/spe,4380100607.

Ryan Iwahashi, Daniela A. Oliveira, S. Felix Wu, Jedidiah R. Crandall, Young-Jun Heo, Jin-Tae Oh, and Jong-Soo Jang. 2008. Towards Automatically Generating Double-Free Vulnerability Signatures Using Petri Nets. In Proceedings of the 11th International Conference on Information Security (ISC '08). Springer-Verlag, Berlin, Heidelberg, 114-130. https://doi.org/10.1007/978- 3- 540-85886- 7_8.

Poul-Henning Kamp. [n. d.]. (2015) malloc (3) Revisited. http://www- public.tem- tsp. eu/~thomas_g/research/ biblio/2015/gidra15asplos- numagic.pdf . ([n. d.]).

Mazen Kharbutli, Xiaowei Jiang, Yan Solihin, Guru Venkataramani, and Mi- los Prvulovic. 2006. Comprehensively and Eciently Protecting the Heap. In Proceedings of the 12th International Conference on Architectural Support for Pro- gramming Languages and Operating Systems (ASPLOS XII). ACM, New York, NY, USA, 207-218. https://doi. org/10.1145/1168857.1168884.

Chris Lattner and Vikram Adve. 2005. Automatic Pool Allocation: Improving Performance by Controlling Data Structure Layout in the Heap. In Proceedings of the 2005 ACM SIGPLAN Conference on Programming Language Design and Implementation (PLDI '05). ACM, New York, NY, USA, 129-142. https://doi.org/.

Doug Lea. [n. d.]. (2013) The GNU C Library. http://www.gnu.org/software/libc/libc. html. ([n. d.]).

Byoungyoung Lee, Chengyu Song, Yeongjin Jang, Tielei Wang, Taesoo Kim, Long Lu, and Wenke Lee. 2015. Preventing Use-after-free with Dangling Pointers Nullication.. In NDSS.

Byoungyoung Lee, Chengyu Song, Taesoo Kim, and Wenke Lee. 2015. Type Casting Verification: Stopping an Emerging Attack Vector. In Proceedings of the 24th USENIX Conference on Security Symposium (SEC'15). USENIX Association, Berkeley, CA, USA, 81-96. http://dl.acm.org/citation.cfm?id=2831143.2831149.

Linux Comunity. 2015. time—time a simple command or give resource usage. https://linux.die.net/man/1/time.

Tongping Liu and Emery D. Berger. 2011. SHERIFF: precise detection and auto- matic mitigation of false sharing. In Proceedings of the 2011 ACM international conference on Object oriented programming systems languages and applications (OOPSLA '11). ACM, New York, NY, USA, 3-18. https://doi.org/10.1145/2048066.2048070.

Shan Lu, Zhenmin Li, Feng Qin, Lin Tan, Pin Zhou, and Yuanyuan Zhou. 2005. Bugbench: Benchmarks for evaluating bug detection tools. In In Workshop on the Evaluation of Software Defect Detection Tools.

Vitaliy B. Lvin, Gene Novark, Emery D. Berger, and Benjamin G. Zorn. 2008. Archipelago: Trading Address Space for Reliability and Security. In Proceedings of the 13th International Conference on Architectural Support for Programming Languages and Operating Systems (ASPLOS XIII). ACM, New York, NY, USA, 115-124. https://doi. org/10.1145/1346281.1346296.

Otto Moerbeek. 2009. A new malloc(3) for OpenBSD. https://www.openbsd.org/papers/eurobsdcon2009/otto- malloc. pdf . (2009).

NIST. [n. d.]. National Vulnerability Database. ([n. d.]). http://nvd.nist.gov/.

Gene Novark and Emery D. Berger. 2010. DieHarder: securing the heap. In Proceedings of the 17th ACM conference on Computer and communications security (CCS '10). ACM, New York, NY, USA, 573-584. https://doi. org/10.1145/1866307.1866371.

Kipp Owens and Rajiv Parikh. 2012. Fast Random Number Generator on the Intel® Pentium® 4 Processor. https://software.intel.com/en- us/articles/ fast- random- number- generator- on- the- intel-pentiumr- 4- processor/. (Mar. 2012).

Jon Rafkind, Adam Wick, John Regehr, and Matthew Flatt. 2009. Precise Garbage Collection for C. In Proceedings of the 2009 International Symposium on Memory Management (ISMM '09). ACM, New York, NY, USA, 39-48. https://doi. org/10.1145/1542431.1542438.

(56) References Cited

OTHER PUBLICATIONS

Sean Reifschneider. [n. d.]. (Dec. 2017) "Pure python memcached client". https://pypi.python. org/pypi/python-memcached. ([n. d.]).

William Robertson, Christopher Kruegel, Darren Mutz, and Fredrik Valeur. 2003. Run-time Detection of Heap-based Overows. In Proceedings of the 17th USENIX Conference on System Administration (LISA '03). USENIX Association, Berkeley, CA, USA, 51-60. http://dl.acm.org/citation.cfm?id=1051937.1051947.

Laszlo Szekeres, Mathias Payer, Tao Wei, and Dawn Song. 2013. SoK: Eternal War in Memory. In Proceedings of the 2013 IEEE Symposium on Security and Privacy (SP '13). IEEE Computer Society, Washington, DC, USA, 48-62. https://doi.org/10.1109/SP.2013.13.

The PaX Team. [n. d.]. (Sep. 10, 2004) Address Space Layout Randomization. https://pax.grsecurity.net/docs/aslr.txt. ([n. d.]).

Yves Younan. 2015. FreeSentry: protecting against use-after-free vulnerabilities due to dangling pointers. In NDSS.

Yves Younan, Wouter Joosen, and Frank Piessens. 2006. Effcient Protection Against Heap-based Buffer Overflows Without Resorting to Magic. In Proceedings of the 8th International Conference on Information and Communications Security (ICICS'06). Springer-Verlag, Berlin, Heidelberg, 379-398. https://doi.org/10.1007/11935308_27.

Yves Younan, Wouter Joosen, Frank Piessens, and Hans Van Den Eynden. 2005. Security of memory allocators for C and C++. Technical Report.Katholieke Universiteit Leuven, Department of Computer Science, Celestijnenlaan 200A-B-3001 Heverlee (Belgium).

Qin Zhao, David Koh, Syed Raza, Derek Bruening, Weng-Fai Wong, and Saman Amarasinghe. 2011. Dynamic Cache, Contention Detection in Multi-threaded Applications. In the International Conference on Virtual Execution Environ- ments. Newport Beach, CA. http://groups.csail.mit.edu/commit/papers/2011/ zhao- vee11- cache-contention.pdf.

Jula, "Deadlock Immunity: Enabling Systems to Defend Against Deadlocks", 2008, 8th USENIX Symposium on Operating Systems Design and Implementation (Year: 2008).

Lwn.net, "The kernel lock validator", 2006, published at https://lwn.net/Articles/185666/ (Year: 2006).

* cited by examiner

Fig. 2

| SECURITY FEATURES | SECURITY PROPERTIES |
|---|---|
| NO/SEGREGATED FREELIST | PREVENT ATTACKS ON FREELIST RELATED POINTERS |
| NO OBJECT HEADERS | PREVENT METADATA RELATED ATTACKS |
| BIBOP STYLE | PREVENT METADATA RELATED ATTACKS |
| FULLY SEGREGATED METADATA | PREVENT METADATA RELATED ATTACKS |
| CONFINING MEMORY REUSE DESTROY ON FREE | PREVENT USE AFTER FREE ATTACKS HELP FINDING SOME MEMORY ERRORS |
| GUARD PAGES | REDUCE ATTACKS OF BUFFER OVERFLOWS AND OVER READS REDUCE HEAP SPRAYING ATTACKS |
| RANDOMIZED ALLOCATION OVER PROVISIONED ALLOCATION | INCREASE DIFFICULTY OF ATTACKS CAUSED BY USE AFTER FREES REDUCE POSSIBLE ATTACKS CAUSED BY OVERFLOWS |
| DELAYED/RANDOMIZED REUSE | REDUCE POSSIBLE ATTACKS CAUSED BY USE AFTER FREES |
| DETECT INVALID FREES | PREVENT ATTACKS CAUSED BY INVALID FREES |
| DETECT DOUBLE FREES | PREVENT ATTACKS CAUSED BY DOUBLE FREES |
| CHECK OVERFLOWS ON FREES | TIMELY STOP ATTACKS CAUSED BY OVERFLOWS |

FREEGUARD: A FASTER SECURE HEAP ALLOCATOR

CROSS-REFERENCE TO RELATED APPLICATIONS

This application claims the benefit of U.S. Provisional Application No. 62/577,636, filed Oct. 26, 2017, the contents of which are incorporated herein in their entirety.

STATEMENT REGARDING FEDERALLY SPONSORED RESEARCH

This invention was made with government support under Grant Number 1566154, awarded by the National Science Foundation. The government has certain rights in the invention.

BACKGROUND OF THE INVENTION

The present invention relates to the technical field of memory allocation in software.

Many software programs, such as web browsers, network servers, etc., often require dynamically managed heap memory. However, it is very challenging to guarantee heap security. Over the past decades, a wide range of heap-related vulnerabilities—such as heap over-reads, heap overflows, use-after-frees, invalid-frees, and double-frees—have been discovered and exploited for attacks, including denial-of-service, information leakage, and control flow hijacking. Further, new heap vulnerabilities continue to emerge.

One conventional method used to secure the program heap is to add defenses within the memory allocator, which can be combined with other security mechanisms, such as non-executable segments and address space layout randomization (ASLR). However, existing allocators are either insecure or inefficient. In particular, existing memory allocators can be classified into two types, based on their implementation mechanisms.

One type belongs to bump-pointer or sequential allocators, which sequentially allocate different sizes of objects in a continuous range. They maintain freelists for different size classes to assist fast allocations, and are also called freelist-based allocators. Representatives of these allocators include both the WINDOWS® and LINUX® allocators, as well as others. Typically, such allocators feature very limited security measures. Even worse, some implementations may directly conflict with the goal of security. For instance, such allocators may place metadata immediately prior to each object, and reutilize the first words of a freed object to store pointers used by their freelists. These designs will significantly increase the attack surface, since attackers can easily overwrite freelist pointers or other metadata to initiate attacks.

A second type of memory allocator includes the BIBOP-style ("Big Bag of Pages") allocators. These designs allocate several pages to serve as a "bag", where each bag will be used to hold heap objects of the same size. The metadata of heap objects, such as the size and availability information, is stored in a separate area. These allocators may avoid corruption of the metadata through isolation mechanisms, and so may provide improved security. Typically, existing "secure" allocators avoid the use of freelists for small objects. Instead, they maintain a bag-based bitmap to indicate the availability of all objects within the bag. Although the bitmap mechanism may reduce the memory consumption associated with tracking the status of heap objects, using only one bit for each object, it may impose significant performance overhead. If allocators utilize randomized allocation, this may impose an even larger overhead. For example, the OPENBSD™ allocator randomly chooses one possible object inside a bag, upon every allocation. However, if this object is not available, it will sequentially search for another available object inside the same bag. In the worst case, the number of checks performed to search the bag can be proportional to the number of objects inside the bag. Furthermore, both OPENBSD™ and DIEHARDER™ may introduce false sharing problems, since multiple threads are sharing the same heap. For these reasons, secure allocators are typically much slower than performance-oriented allocators.

Accordingly, a need arises for memory allocation techniques that provide improved security and performance.

SUMMARY OF THE INVENTION

The techniques described herein may include memory allocation techniques that provide improved security and performance. For example:

The techniques described herein may provide a novel memory layout that combines the benefits of both BIBOP-style and sequential allocators. The present techniques may take the approach of BIBOP-style allocators: each bag, consisting of multiple pages, may hold objects with the same size class, while the object metadata is placed in an area separate from the actual heap. This design helps prevent attacks caused by corrupted metadata. At the same time, the present techniques may provide a "sequential bag placement" employing the vast address space of 64-bit machines by mapping a huge chunk of memory initially, then dividing it into multiple heaps. Each heap may be further divided into multiple sub-heaps, proportional to the number of threads, and bags with increasing size classes may be placed sequentially, starting, for example, from the minimum size class to the maximum size class. This layout may provide constant-time metadata lookup. If one bag inside the current heap is exhausted, new requests may be processed from the equivalent bag in the next available heap. For the purposes of security, parameters may be randomized, such as bag size, heap starting address, and metadata starting address, all of which increase the difficulty of attacks. Also, guard pages may be randomly inserted throughout, in order to defend against buffer overflows and heap spraying.

The present techniques may utilize the freelist technique from performance-oriented allocators, and may apply the shadow memory technique based on its novel layout. Using freelists may provide constant-time memory allocations and deallocations. Further single-linked lists may be utilized in order to prevent cycles within the list, which avoids the issue of double frees. Freelists may be utilized to manage freed objects, but the freelist pointers may be placed into segregated shadow memory, such that they cannot be easily corrupted.

The present techniques may reduce the number of mmap( ) calls required for allocating both the bags, and the metadata required for managing these chunks. This design not only may avoid the performance overhead caused by performing a large number of system calls, but may also save kernel resources in managing numerous small virtual memory regions. For the purposes of security, internal guard pages may be placed within each bag, based on a user-specified budget.

In embodiments, a method implemented in a computer system including a processor and a memory may comprise mapping a block of memory, dividing the block of memory into a plurality of heaps, dividing each heap into a plurality of sub-heaps, wherein each sub-heap is associated with one thread of software executing in the computer system, dividing each sub-heap into a plurality of bags, wherein each bag is associated with one size class of objects, and storing a plurality of objects in at least some of the bags, wherein each object is stored in a bag having size class corresponding to a size of the object.

In embodiments, the method may further comprise randomly inserting a plurality of guard pages within each bag. A number of guard pages to be inserted is based on a predetermined budget. The method may further comprise maintaining a plurality of bump pointers for each size class of each per-thread heap, which always point to a first never-allocated object. The method may further comprise when a bump pointer refers to a start of a new page, determining whether the new page should be utilized as a guard page based on the predetermined budget. The method may further comprise maintaining a plurality of freelists managing freed objects for each size class of each per-thread heap.

In embodiments, a system may comprise a processor, memory accessible by the processor, and program instructions and data stored in the memory, the program instructions executable by the processor to perform: mapping a block of memory, dividing the block of memory into a plurality of heaps, dividing each heap into a plurality of sub-heaps, wherein each sub-heap is associated with one thread of software executing in the computer system, dividing each sub-heap into a plurality of bags, wherein each bag is associated with one size class of objects, and storing a plurality of objects in at least some of the bags, wherein each object is stored in a bag having size class corresponding to a size of the object.

In embodiments, a computer program product may comprise a non-transitory computer readable medium storing program instructions that when executed by a processor perform: mapping a block of memory, dividing the block of memory into a plurality of heaps, dividing each heap into a plurality of sub-heaps, wherein each sub-heap is associated with one thread of software executing in the computer system, dividing each sub-heap into a plurality of bags, wherein each bag is associated with one size class of objects, and storing a plurality of objects in at least some of the bags, wherein each object is stored in a bag having size class corresponding to a size of the object.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
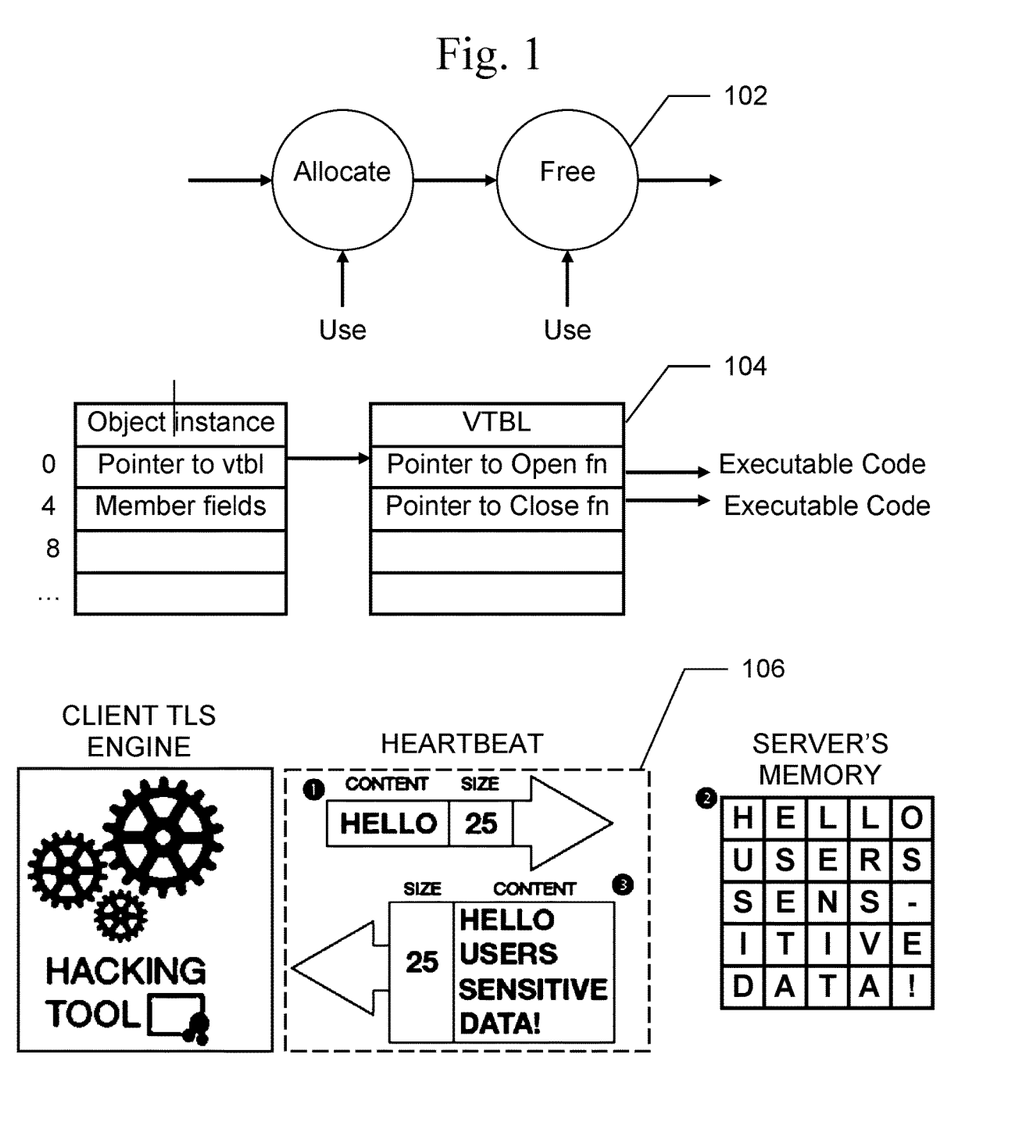
FIG. 1 illustrates examples of heap-related memory vulnerabilities.

There are a number of different types of heap-related memory vulnerabilities that may make a heap-based memory allocation scheme susceptible to attack. Examples of such heap-related memory vulnerabilities are shown in FIG. 1.

Heap Over-reads: A heap over-read 106 occurs when a program overruns the boundary of an object, possibly reading adjacent memory that was not intended to be accessible. It includes heap under-reads, where memory locations prior to the target buffer are referenced. Heap over-reads can occur due to a lack of built-in bounds-checking on memory accesses, particularly for C/C++ programs. They can cause erratic program behavior, including memory access errors, incorrect results, or a crash. They can also lead to security problems, including information leakage and denial-of-service attacks.

Heap Overflows: A heap overflow 104 occurs when a program writes outside of the boundary of an allocated object. As with heap over-reads, heap overflows may also be used to refer to the related problem of corrupting memory immediately prior to the allocated object. Buffer overflows can cause security problems such as illegitimate privilege elevation, execution of arbitrary code, denial-of-service, and heap smashing.

Use-after-frees and Double-frees: Use-after-free 102 occurs when an application accesses a previously deallocated object. Double-frees are considered to be a special case of use-after-free, and occur when an object has been freed twice. Depending on the design of the specific allocator, use-after-free may cause execution of arbitrary code, loss of integrity, and denial-of-service attacks.

Invalid frees: For invalid frees, applications invoke free( ) on a pointer that was not acquired using heap allocation functions, such as malloc( ), calloc( ), or realloc( ). Invalid frees can cause the execution of arbitrary code, intentional modification of data, and denial-of-service attacks.

Other Heap Errors: Other heap-related security vulnerabilities exist, including: initialization errors, failure of return values, improper use of allocation functions, mismatched memory management routines (e. g., malloc/delete), and uninitialized reads, all of which can lead to exploitable vulnerabilities.

The present techniques may avoid the above-mentioned problems and provide a novel allocator that balances performance and effectiveness. The present techniques may utilize security features 200 shown in FIG. 2 and further may utilize a lower entropy for randomization. In an embodiment, a feature that may not be implemented by the present techniques is over-provisioned allocation. Over-provisioned allocation is useful to increase randomization and reduce attacks caused by buffer overflows, since overflows may occur in unallocated free space. However, over-provisioned allocation may significantly increase memory consumption, and greatly decrease performance due to lower cache and memory utilization, combined with higher TLB pressure. Instead, the present techniques may check for the occurrence of overflow on neighboring objects at each deallocation, not just the item being freed. Then, if an overwrite is detected, the program may be stopped immediately. This method may help thwart attacks caused by overflows in a more timely manner.

For performance reasons, the present techniques may adapt the freelist mechanism that is widely utilized in performance-oriented allocators, such as the allocators of WINDOWS® and LINUX® systems. Freelists excel at performance, since each allocation and deallocation can be completed in constant time. Also, the freelist maintains the order of deallocations, which helps reduce attacks caused by use-after-frees, the most serious type of security attacks in many products recently. Different from existing freelist allocators, the present techniques may allocate these freelist pointers in a separate space, and may use only a single-linked list, to reduce memory consumption, shown as the shadow memory in FIG. 4. To save space, object status information is stored within the same word: if the object is available, then its lowest-order bit will be 0 (this will hold true whether the location contains a pointer to the next available object, or whether it is null, indicating no next-available object exists). Conversely, if the object is in-use, its status will exactly equal 1.

In embodiments, the present techniques may reduce performance overhead and memory consumption caused by page-based mmap( ) operations. In order to reduce calls to mmap( ), the present techniques may allocate a huge block initially, and places guard pages randomly inside each bag (shown as boxes with diagonal lines in FIG. 4). Guard pages may be placed randomly to occupy, for example, 10% of each bag. This method may reduce the number of mmap( ) calls to less than 10%, since other allocators may invoke additional mmap( ) system calls to allocate storage for metadata structures, as well.

In embodiments, the present techniques may improve the performance of fetching corresponding metadata. Currently systems create a hash table in which to map the page address of heap objects to a specific index, and grows the total size of this hash table whenever necessary. However, this still imposes significant performance overhead, especially when multiple pages are mapped to the same bucket. Instead, the present techniques may rely on the fact that 64-bit machines have a vast address space, and utilizes the shadow memory technique to save metadata. For any given heap address, the present techniques may quickly compute the location of its metadata, and vise-versa. An example of the memory layout of the allocator is shown as FIG. 4, and further described below.

In embodiments, the functionality of the present techniques may be implemented as a library of memory allocation routines, which may be linked to original applications during the software build process.

Figure 2:
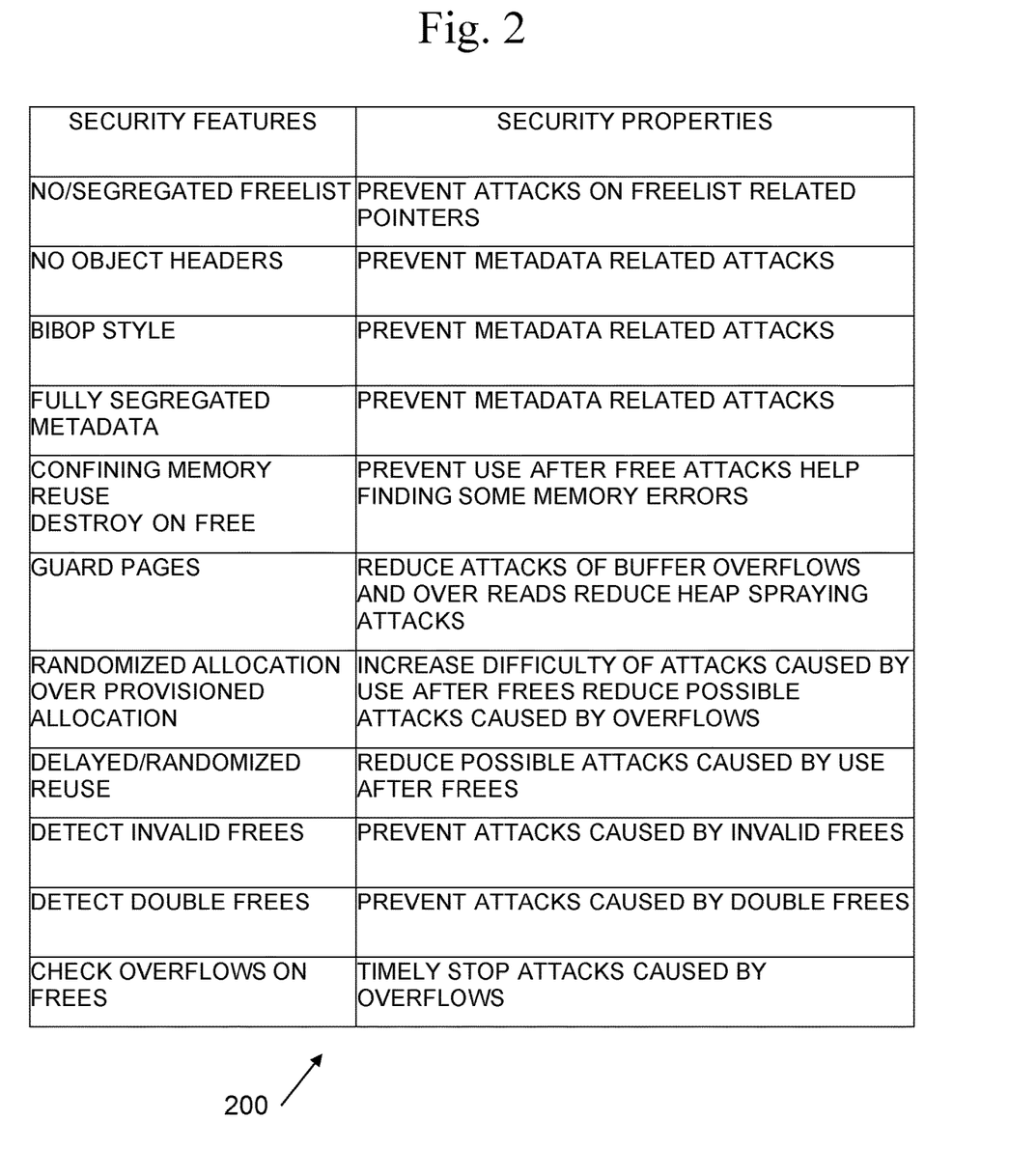
FIG. 2 illustrates examples of memory allocation security features.

Examples of security properties 200 supported by the present techniques are shown in FIG. 2. Overall, the present techniques may have relatively high performance, but may provide an improved security guarantee. Next, we discuss the attacks that may be stopped by the present techniques, and explain the fundamental reasoning.

Scope: For attacks based on invalid and double frees, the present techniques may prevent all such attacks, as long as the status of an object is never corrupted. Because the status information is kept in a separate location, this will greatly reduce the possibility of success for these attacks. Even if the status were to be modified by the attacker, some invalid frees caused by an invalid address can be prevented due to the novel allocator design of the present techniques.

Buffer overflow/over-read attacks will fail if the access touches one of the guard pages inserted randomly by the present techniques. Additionally, buffer overflows may be detected if one of the implanted canaries is found to have been corrupted. Implanting canaries will result in additional verification steps at the time the object (or one of its adjacent neighbors) is freed. At the same time, the difficulty of issuing these two types of attacks is increased due to randomized allocations, since the address of a target object is much harder to guess.

Attacks based on use-after-frees are reduced by utilizing delayed memory reuses. If an object is not re-utilized, the attacker may fail to exploit use-after-frees, since it will not cause any ill effect. Also, memory reuses are randomized to increase the difficulty of successful attacks.

Assumptions: the present techniques may assume that the starting addresses of both the heap and the shadow memory are kept hidden from the attacker. If an attacker has knowledge of these addresses, he can possibly change the status of an object, and force the allocator to make an incorrect decision. To avoid the predictability of these addresses, the present techniques may allocate this memory using the mmap( ) system call, which is guaranteed to return a random address if ASLR is enabled on the underlying OS. However, if the attacker has permission to run a program on the machine, he may be able to guess the location of the metadata, then take control of memory allocation.

Figure 3:
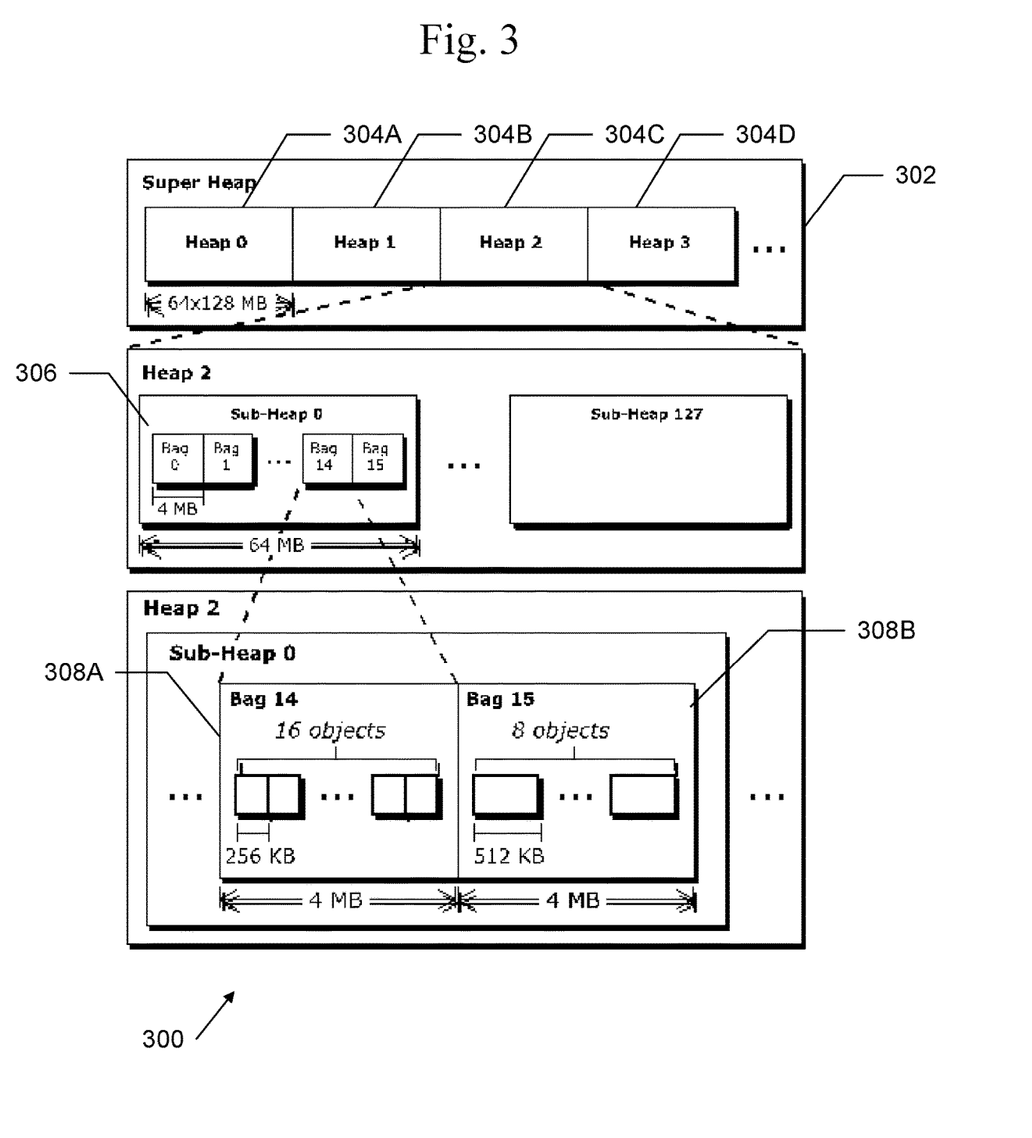
FIG. 3 illustrates an example of a memory layout in accordance with the present techniques.

The present techniques may utilize a BIBOP-style heap layout in order to place the metadata in another location, avoiding possible metadata-based attacks. An example of such a heap layout 300 is shown in FIG. 3. Heap layout 300 may include a top layer 302 or super heap, which may include a plurality of heaps 304A-N. A heap may be a collection of data from many threads. Each thread may be given a dedicated sub-heap, such as sub-heap 306, in a heap. Each sub-heap may be made up of a plurality of bags, such as bags 308A-B. For example, each sub-heap may include 16 bags. In embodiments, all bags may have the same capacity. Each bag may serve a specific object size class. In embodiments, size classes may increase by powers-of-two.

As a BIBOP-style heap layout places the metadata in another location the "fully-segregated metadata" target shown in FIG. 2 may be achieved. The present techniques may utilize freelists for better performance, rather than using a bitmap. Further, the present techniques may support the fast fetching of metadata (such as freelist pointers) using a novel heap layout, as shown in FIG. 3.

The present techniques may initially map a huge block of memory 302, and divide this block into multiple heaps 304A-D. Inside each heap 304A-D, the present techniques may employ a per-thread sub-heap design, for example, 306, so that memory allocations from different threads will be satisfied from different sub-heaps, in order to avoid possible false sharing problems. All bags belonging to a thread, which hold objects with different size classes, are located together. The bag size, starting address of the heap, and the starting address of the shadow memory that keeps the metadata of heap objects, are randomly chosen for each execution for the purpose of increased security.

Figure 4:
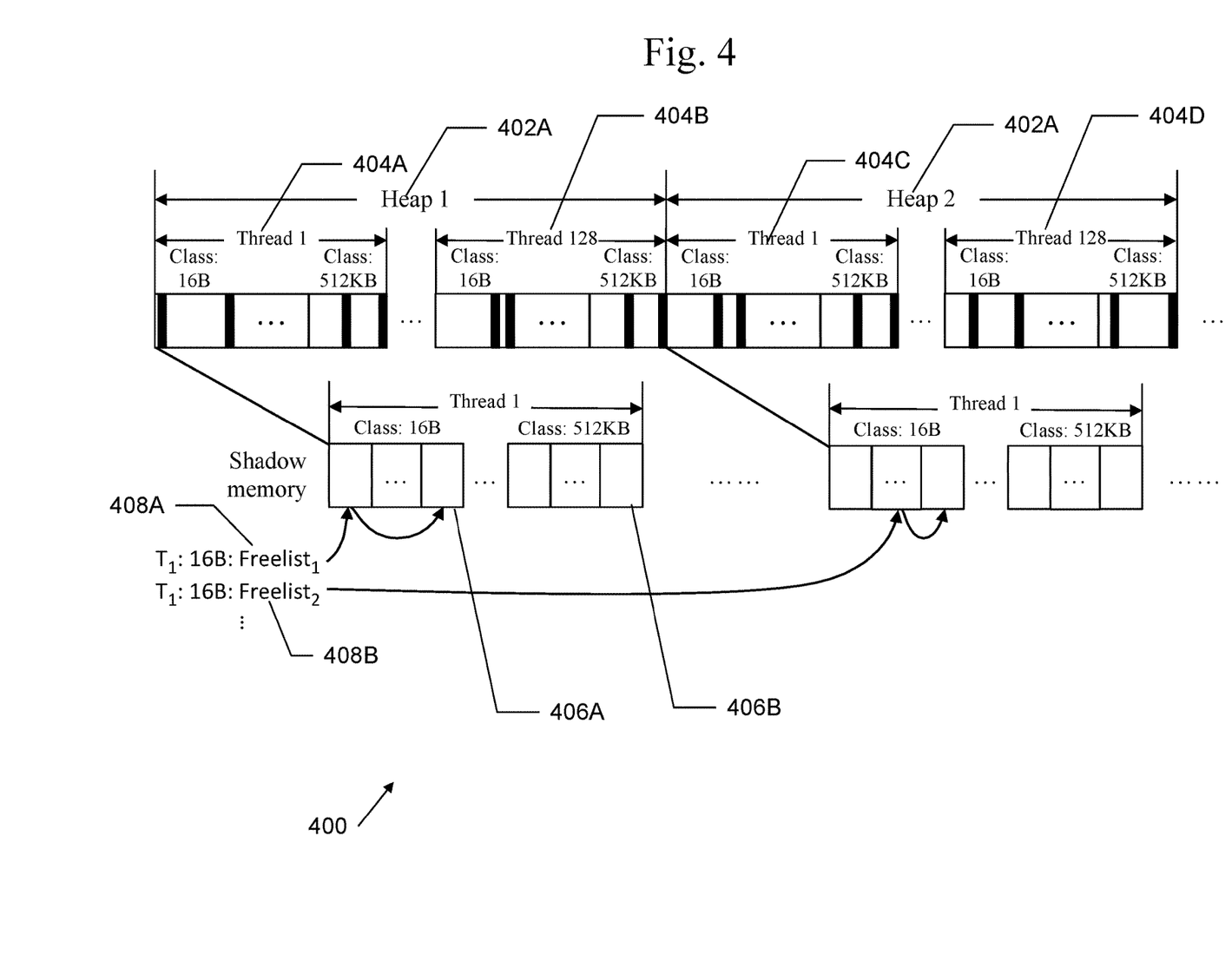
FIG. 4 illustrates an example of a memory layout in accordance with the present techniques.

The memory layout of the present techniques is shown in more detail in FIG. 4. Each heap 402A-B may include a plurality of sub-heaps 404A-D, which may be arranged with one or more sub-heaps per thread, so that memory allocations from different threads will be satisfied from different sub-heaps, in order to avoid possible false sharing problems. Each sub-heap may include a plurality of bags 406A-B, which may be arranged with one or more bags per size class. All bags belonging to a thread, which hold objects with different size classes, are located together. Freelists 408A-B point to free locations within each bag. The bag size, starting address of the heap, and the starting address of the shadow memory that keeps the metadata of heap objects, are randomly chosen for each execution for the purpose of increased security.

Figure 5:
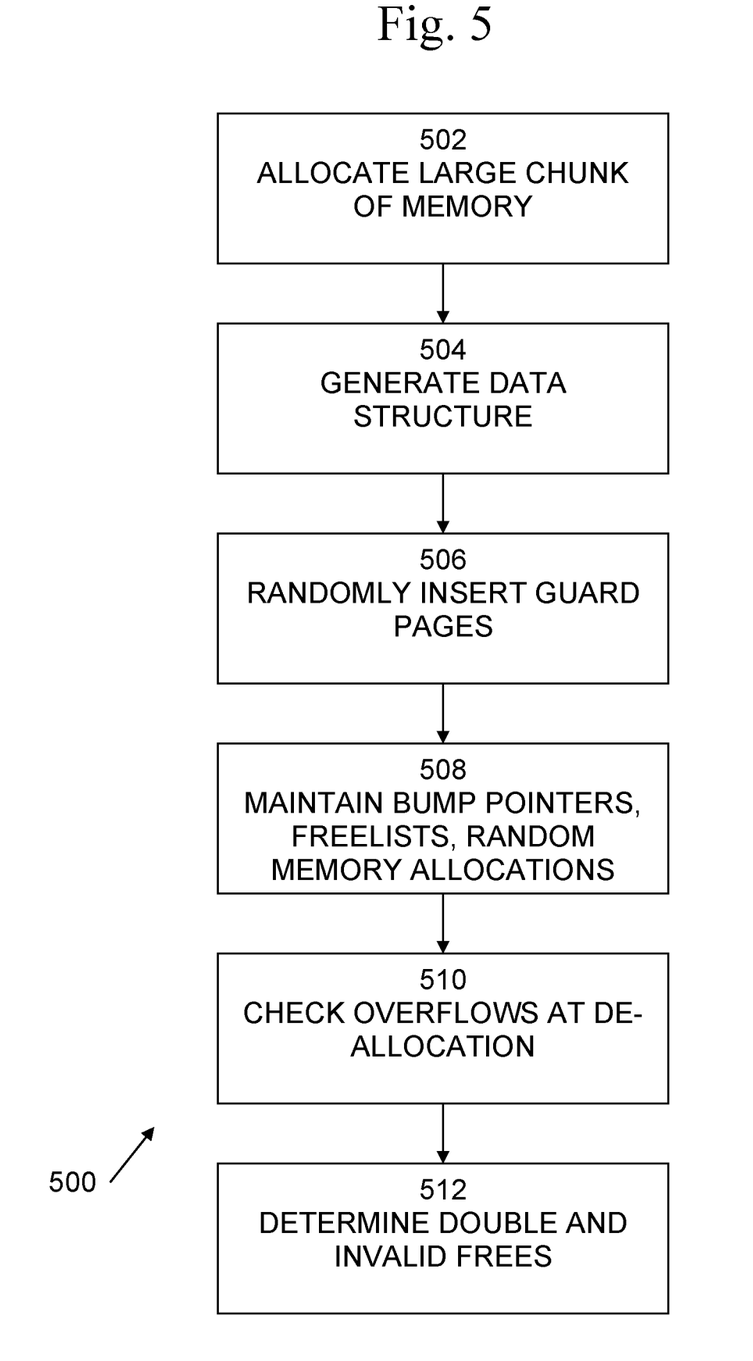
FIG. 5 illustrates an example of processes of the present techniques.

An exemplary flow diagram of a process 500 of operation of the present techniques is shown in FIG. 5. In embodiments, the present techniques may implement other security features, as shown in FIG. 2. The process begins at 502, wherein a large chunk of memory may be allocated. For example, the present techniques may initially utilize the mmap( ) system call to allocate a large chunk of memory, where the starting address of the heap may be randomized between executions, a feature enabled by the ASLR mechanism of the underlying OS. At 504, a data structure, such as that shown in FIGS. 3 and 4 may be generated within the allocated large chunk of memory. The bag size utilized throughout each execution, which remains the same across the different size classes, is randomized with every execution, and ranges between 4 MB and 32 MB. These mechanisms guarantee that the starting address of each bag is random across multiple executions.

At 506, guard pages may be randomly inserted within each bag. Prior to allocating objects from a new page, the process may determine whether this page should be utilized as a guard page. This decision is based on a predetermined user budget, such as 10%. Thus, in this example, 10% of pages inside each bag will be chosen as guard pages. When a page is randomly selected to be a guard page, the process may invoke the mprotect( ) system call to make this page inaccessible, such that all memory accesses on this page will be treated as invalid, and trigger segmentation faults. For a bag with a size class larger than one page (4 KB), the size of the guard pages may, for example, be the same as the size class. That is, multiple pages will be utilized as guard pages in order to avoid misalignment of the metadata. Guard pages are useful for stopping buffer overflows, buffer over-reads, and heap spraying, as access on guard pages will immediately stop execution.

The present techniques may take a different approach from all existing allocators, by balancing randomization and performance. For example, at 508, the process may maintain bump pointers for each size class of each per-thread heap, which always point to the first never-allocated object. For example, four bump pointers may be allocated. Objects may be allocated in a sequential order. After an object is allocated, the corresponding pointer may be bumped up to the next one. Whenever a bump pointer refers to the start of a new page, the process may determine whether this new page should be utilized as a guard page, as discussed above. In embodiments, the process may use this sequential order for the purposes of performance.

At 508, the process may also maintain freelists to manage freed objects for each size class of each per-thread heap. For example, freelists may be maintained. A freed object may be added into one-out-of-four freelists randomly. Objects in a freelist may be reused in a first-in/first-out (FIFO) order. In this way, some use-after-free problems may be prevented automatically, since a freed object may be reallocated only after a long period, in which any use-after-free problems appearing in this period can be tolerated automatically. However, this method may slightly reduce performance compared with allocators using the last-in/first-out (LIFO) order. For the LIFO order, there is a significant chance that a newly allocated object is still inside the cache, which can avoid fetching from memory. However, the FIFO method may be superior to LIFO implementations in terms of security. The FIFO method may significantly increase the difficulty of guessing the address of an allocation, due to the combination of FIFO and randomization. Overall, the FIFO mechanism increases both reliability and security. This mechanism cannot easily be supported when using bitmaps. Bitmap-based allocators only use one bit to indicate the state of an object, either in-use or free. After a freed object is returned to the bitmap, there is no way to maintain the temporal information. Due to the use of FIFO, there is no need to utilize a delay buffer, which is different from Bitmap-based allocators.

At 508, the process may maintain random allocation of memory. An allocation request could be satisfied either from one the bump pointers, or one of the freelists, based on the value of a random number. This randomization may be achieved through the following steps. First, a random number R may be generated using a random number generator, such as the Intel SSE2 number generator. Then, the modulus value N may be determined by calculating R % 4. N will determine which freelist or bump pointer may be utilized. The Nth freelist may be checked first, and if freed objects are available, then they may be reused to satisfy the request. However, if there are no free objects in this freelist, the allocation may fall back to the Nth bump pointer. Further, if the expression R % W is equal to zero, where W represents a weighting factor, then the Nth bump pointer may be used, regardless of whether the Nth freelist contains any objects available for reuse. Therefore, in terms of W, there is a 1-in-W chance of overriding the freelist and using the bump pointer instead. This method may slightly increase memory consumption and cause some slowdown, due to the increased memory footprint. However, it actually increases randomization, and thus, security.

In embodiments, the glibc rand function may be utilized to generate a random number. However, this method may be very slow due to lock conflicts. The invocation of rand will acquire a global lock, which may prevent another thread from simultaneously obtaining a random number. To improve performance, in embodiments, a fast pseudo-random number generator (RNG) may be utilized. This faster RNG may be optimized, for example, using Intel's SSE2 extensions, and further, does not require the use of synchronization primitives internally. Adopting this fast RNG may significantly reduce the performance overhead.

At 510, overflows may be checked at deallocation of an object. In embodiments, the number of checks upon each deallocation may vary. For example, the process may check the deallocated object and the neighboring four objects, two before the current object and two after, instead of just the deallocated object. In embodiments, in order to support this, every allocation request may add one additional byte, at the end of the object, in which to hold a canary value. Upon deallocation, if one of the canary values has been changed to other values, the process may halt execution of the current program. For example, if the process checks the deallocated object and the neighboring four objects, then five canary values may be checked. Note, that adding one byte to the end of an object may significantly increase memory consumption, since the process may manage objects within size classes featuring powers of two. Thus, one additional byte may double the size of the memory consumption in the worst case.

At 512, it is determined whether double and invalid frees have occurred or will occur. For both of these problems, the process may halt the execution immediately, and report the problem precisely, with 100% guarantee. In embodiments, the process may determine and prevent the following invalid frees: (1) If a free pointer lies outside the address range of the heap, a case which is easy to detect, and that most allocators can possibly detect. (2) If a free pointer falls within the range of the heap, but was never allocated. This could be discovered easily by checking its corresponding status. However, the LINUX® allocator may wrongly consider this problem to be a double-free error. The present techniques may avoid this issue and reports it correctly. (3) If a free pointer is not aligned to the object's specific size class. The present techniques may detect this problem based on its "information computable" design. The present techniques may avoid false alarms and false negatives present in the LINUX® allocator, and caused by corruption of metadata, since the present techniques may maintain the status of each object in shadow memory that is segregated from the actual heap.

The present techniques may also rely on the status information to detect possible double-frees upon deallocations. The present techniques may report possible double frees, avoiding the implementation faults of the other allocators. The segregation of metadata ensures that the present techniques can always detect double frees, unlike the other allocators.

The present techniques may allocate large objects using the mmap( ) system call, then unmap these objects by invoking the munmap( ) system call. In embodiments, large objects may be defined as those larger than 512 KB.

Figure 6:
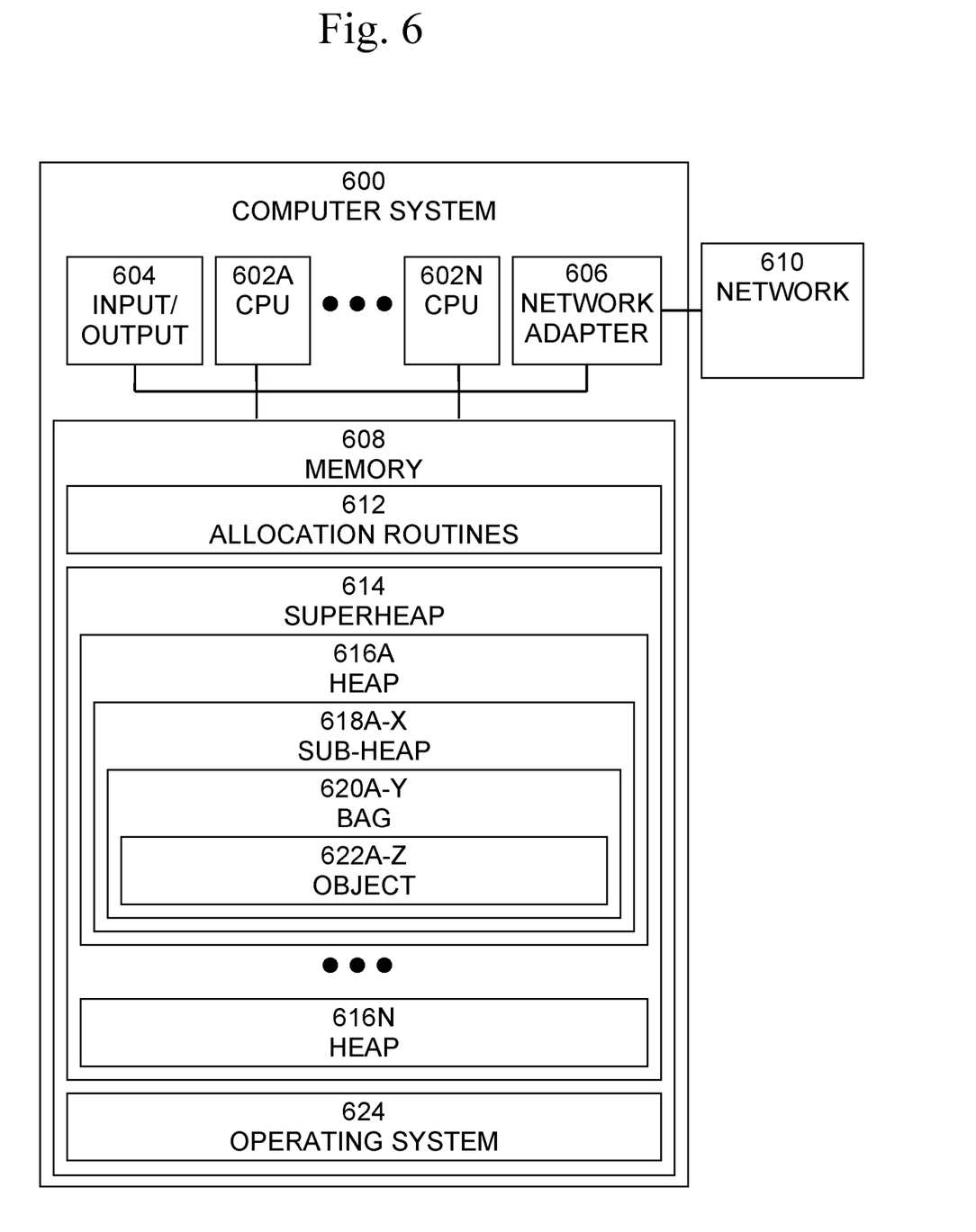
FIG. 6 an example of a computer system in which embodiments of the present techniques may be implemented.

An exemplary block diagram of a computer system 600, in which entities and processes involved in the embodiments described herein may be implemented, is shown in FIG. 6. Computer system 600 may typically be implemented using one or more programmed general-purpose computer systems, such as embedded processors, systems on a chip, personal computers, workstations, server systems, and mini-computers or mainframe computers, or in distributed, networked computing environments. Computer system 600 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor.

FIG. 6 illustrates an embodiment in which computer system 600 is implemented as a single multi-processor computer system, in which multiple processors 602A-602N share system resources, such as memory 608, input/output circuitry 604, and network adapter 606. However, the present communications systems and methods also include embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather distributed among a plurality of systems or devices, based on well-known engineering considerations. The present communications systems and methods may include any and all such arrangements.

In the example shown in FIG. 6, memory 608 may include allocation routines 612, superheap 614, and operating system 620. Allocation routines 612 may include software routines to perform processing to implement memory allocation according to the present techniques as described above. Superheap 614 may include a top layer memory chunk that contains one or more heap structures 616A-N. Each heap 616A-N may include a plurality of sub-heap memory structures 618A-X. A heap may be a collection of data from many threads, with each thread having a dedicated sub-heap 618A-X. Each sub-heap 618A-X may include a plurality of bag memory structures 620A-Y. Each bag 620A-Y may hold a plurality of objects 622A-Z, with each bag holding objects of the same size class. Operating system 620 may provide overall system functionalities.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e. g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U. S. C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method implemented in a computer system including a processor and a memory, the method comprising:
   mapping a block of memory;
   dividing the block of memory into a plurality of heaps;
   dividing each heap into a plurality of sub-heaps, wherein each sub-heap is associated with one thread of software executing in the computer system;
   dividing each sub-heap into a plurality of bags, wherein each bag is associated with one size class of objects; and
   storing a plurality of objects in at least some of the bags, wherein each object is stored in a bag having size class corresponding to a size of the object; and
   randomly inserting a plurality of guard pages within each bag.

2. The method of claim 1, wherein a number of guard pages to be inserted is based on a predetermined budget.

3. The method of claim 2, further comprising:
   maintaining a plurality of bump pointers for each size class of each per-thread heap, which always point to a first never-allocated object.

4. The method of claim 3, further comprising:
   when a bump pointer refers to a start of a new page, determining whether the new page should be utilized as a guard page based on the predetermined budget.

5. The method of claim 4, further comprising:
   maintaining a plurality of freelists managing freed objects for each size class of each per-thread heap.

6. A system comprising a processor, memory accessible by the processor, and program instructions and data stored in the memory, the program instructions executable by the processor to perform:
   mapping a block of memory;
   dividing the block of memory into a plurality of heaps;
   dividing each heap into a plurality of sub-heaps, wherein each sub-heap is associated with one thread of software executing in the computer system;
   dividing each sub-heap into a plurality of bags, wherein each bag is associated with one size class of objects; and
   storing a plurality of objects in at least some of the bags, wherein each object is stored in a bag having size class corresponding to a size of the object; and
   randomly inserting a plurality of guard pages within each bag.

7. The method of claim 6, wherein a number of guard pages to be inserted is based on a predetermined budget.

8. The method of claim 7, further comprising:
   maintaining a plurality of bump pointers for each size class of each per-thread heap, which always point to a first never-allocated object.

9. The method of claim 8, further comprising:
   when a bump pointer refers to a start of a new page, determining whether the new page should be utilized as a guard page based on the predetermined budget.

10. The method of claim 9, further comprising:
    maintaining a plurality of freelists managing freed objects for each size class of each per-thread heap.

11. A computer program product comprising a non-transitory computer readable medium storing program instructions that when executed by a processor perform:
    mapping a block of memory;
    dividing the block of memory into a plurality of heaps;
    dividing each heap into a plurality of sub-heaps, wherein each sub-heap is associated with one thread of software executing in the computer system;

dividing each sub-heap into a plurality of bags, wherein each bag is associated with one size class of objects; and storing a plurality of objects in at least some of the bags, wherein each object is stored in a bag having size class corresponding to a size of the object; and randomly inserting a plurality of guard pages within each bag.

12. The method of claim 11, wherein a number of guard pages to be inserted is based on a predetermined budget.

13. The method of claim 12, further comprising:
maintaining a plurality of bump pointers for each size class of each per-thread heap, which always point to a first never-allocated object.

14. The method of claim 13, further comprising:
when a bump pointer refers to a start of a new page, determining whether the new page should be utilized as a guard page based on the predetermined budget.

15. The method of claim 14, further comprising:
maintaining a plurality of freelists managing freed objects for each size class of each per-thread heap.

* * * * *